United States Patent
Voss et al.

(10) Patent No.: US 7,393,274 B2
(45) Date of Patent: Jul. 1, 2008

(54) COMBINE HARVESTER PROCESSING SYSTEM HAVING ADJUSTABLE MEMBERS

(75) Inventors: Douglas A. Voss, Wichita, KS (US); Brian J. Hollatz, Rio Grande do Sul (BR); Robert Honas, Newton, KS (US); Bernard Regier, Newton, KS (US); Eduardo De Oliveira Cristal, Porto Alegra/RS (BR)

(73) Assignee: AGCO Corporation, Duluth, GA (US)

( * ) Notice: Subject to any disclaimer, the term of this patent is extended or adjusted under 35 U.S.C. 154(b) by 236 days.

(21) Appl. No.: 11/345,571

(22) Filed: Feb. 1, 2006

(65) Prior Publication Data

US 2007/0178951 A1 Aug. 2, 2007

(51) Int. Cl.
*A01F 12/28* (2006.01)

(52) U.S. Cl. ..................................... 460/109

(58) Field of Classification Search ................ 460/109, 460/104, 59, 107, 72, 46; 241/185.5, 32
See application file for complete search history.

(56) References Cited

U.S. PATENT DOCUMENTS

| | | | |
|---|---|---|---|
| 2,053,148 A | 9/1936 | James | |
| 2,794,438 A * | 6/1957 | Heth | 460/109 |
| 3,209,760 A * | 10/1965 | Claas | 460/106 |
| 3,470,881 A | 10/1969 | Knapp et al. | |
| 3,547,129 A * | 12/1970 | Hirsch | 460/109 |
| 3,871,384 A * | 3/1975 | Depauw et al. | 460/109 |
| 4,004,404 A * | 1/1977 | Rowland-Hill et al. | 56/14.6 |
| 4,154,250 A | 5/1979 | Stuber | |
| 4,262,679 A | 4/1981 | James | |
| 4,330,000 A | 5/1982 | Peiler | |
| 4,484,588 A | 11/1984 | Huhman et al. | |
| 4,672,981 A | 6/1987 | Huhman | |
| 4,706,690 A | 11/1987 | Huhman | |
| 4,711,075 A * | 12/1987 | Strong | 460/120 |
| 4,711,252 A * | 12/1987 | Bernhardt et al. | 460/107 |
| 4,774,968 A | 10/1988 | Spanlang | |
| 4,993,991 A * | 2/1991 | Yarmashev et al. | 460/66 |
| 5,743,795 A | 4/1998 | Kersting | |
| 6,325,713 B1 | 12/2001 | Haar et al. | |
| 6,358,142 B1 | 3/2002 | Imel et al. | |
| 6,485,365 B2 * | 11/2002 | Imel et al. | 460/119 |
| 6,503,142 B2 * | 1/2003 | Imel et al. | 460/107 |
| 6,530,833 B2 * | 3/2003 | Imel et al. | 460/109 |
| 6,758,745 B2 * | 7/2004 | Van Der Haegen et al. | 460/109 |
| 6,958,012 B2 | 10/2005 | Duquesne et al. | |
| 2002/0160822 A1 | 10/2002 | Imel et al. | |
| 2005/0009591 A1* | 1/2005 | Duquesne et al. | 460/107 |
| 2005/0176483 A1 | 8/2005 | Schenk | |
| 2005/0176484 A1 | 8/2005 | Schenk | |

FOREIGN PATENT DOCUMENTS

EP 92599 A1 * 11/1983

OTHER PUBLICATIONS

Gleaner Parts Catalog Form #79017110, Jun. 1996 (selected pages)(4 pages).

* cited by examiner

*Primary Examiner*—Árpád Fábián-Kovács
(74) *Attorney, Agent, or Firm*—Hovey Williams LLP

(57) ABSTRACT

The arcuate processing assembly of a combine harvester may be pivotally adjusted generally radially toward or away from a rotary processing device to adjust the operating clearance between the periphery of the rotary device and the assembly. Simultaneously with such adjustment of the assembly as a whole, in a compound pivoting action one arcuate member of the assembly is also pivoted relative to the other arcuate member to properly reshape the threshing region for the adjusted running clearance.

28 Claims, 14 Drawing Sheets

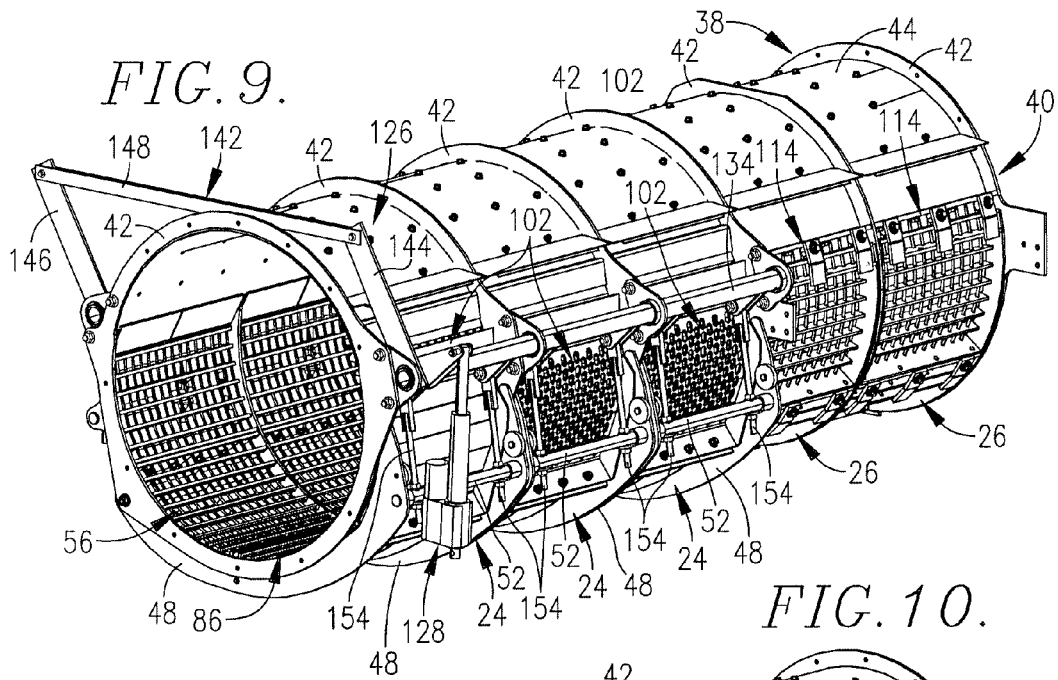
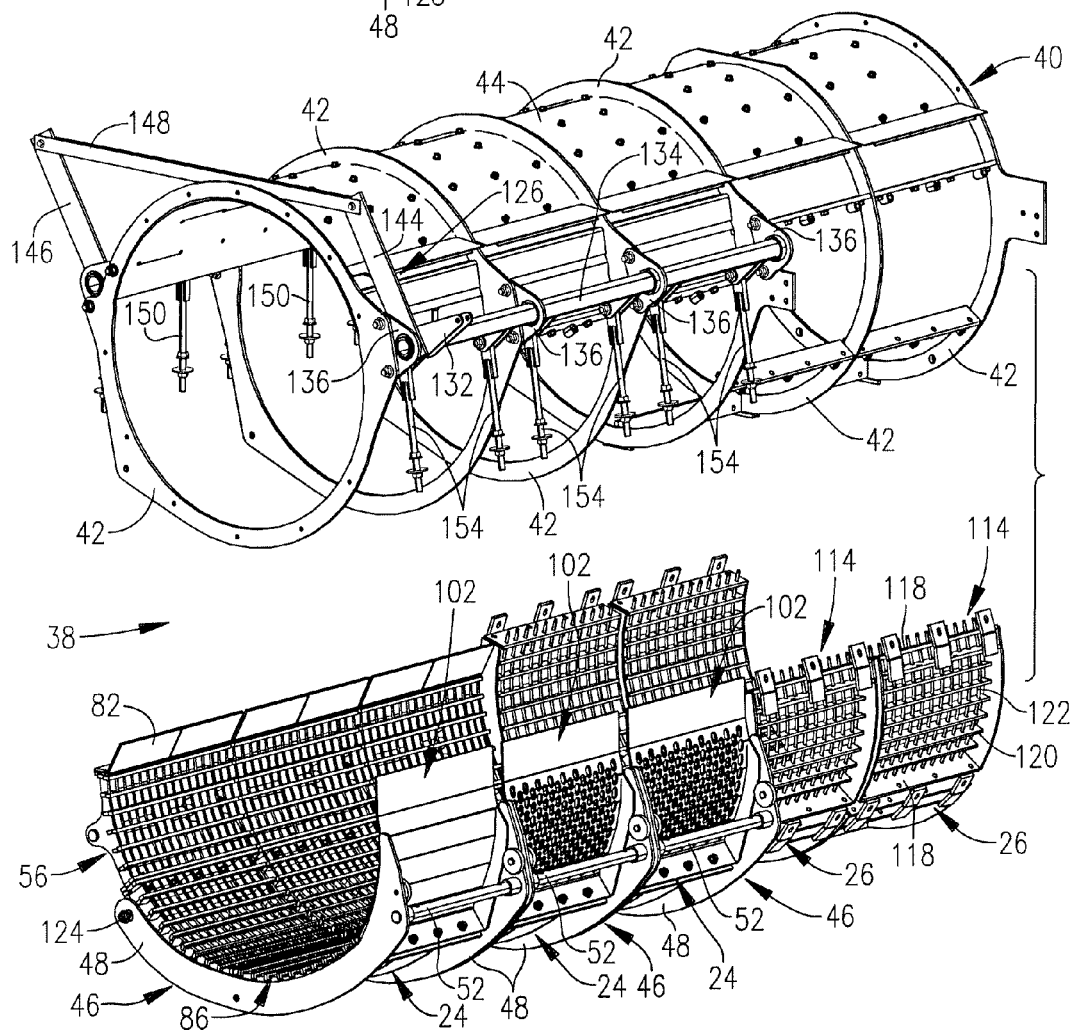

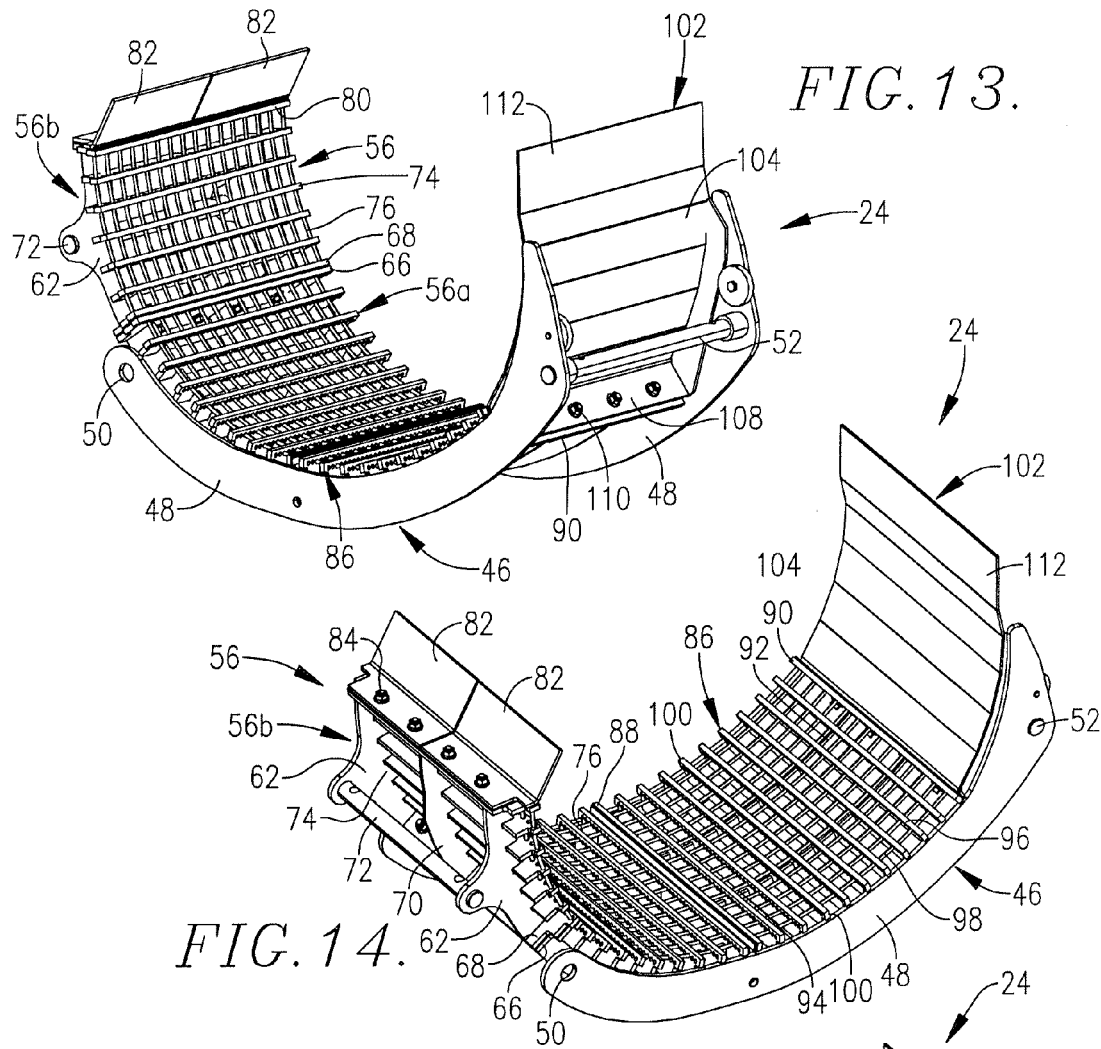
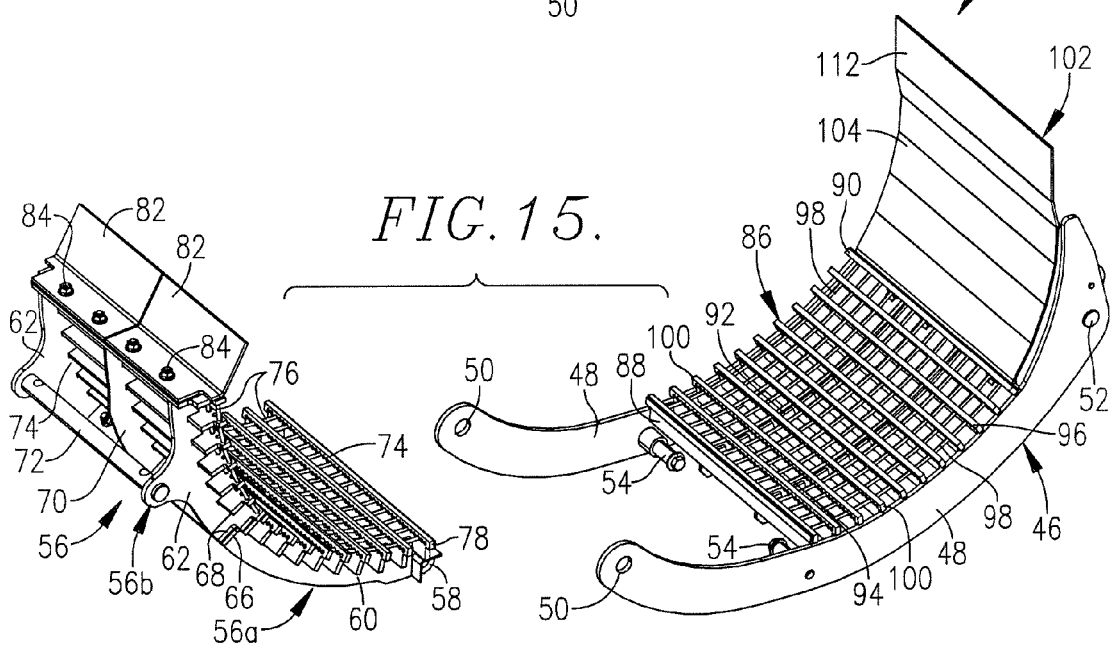

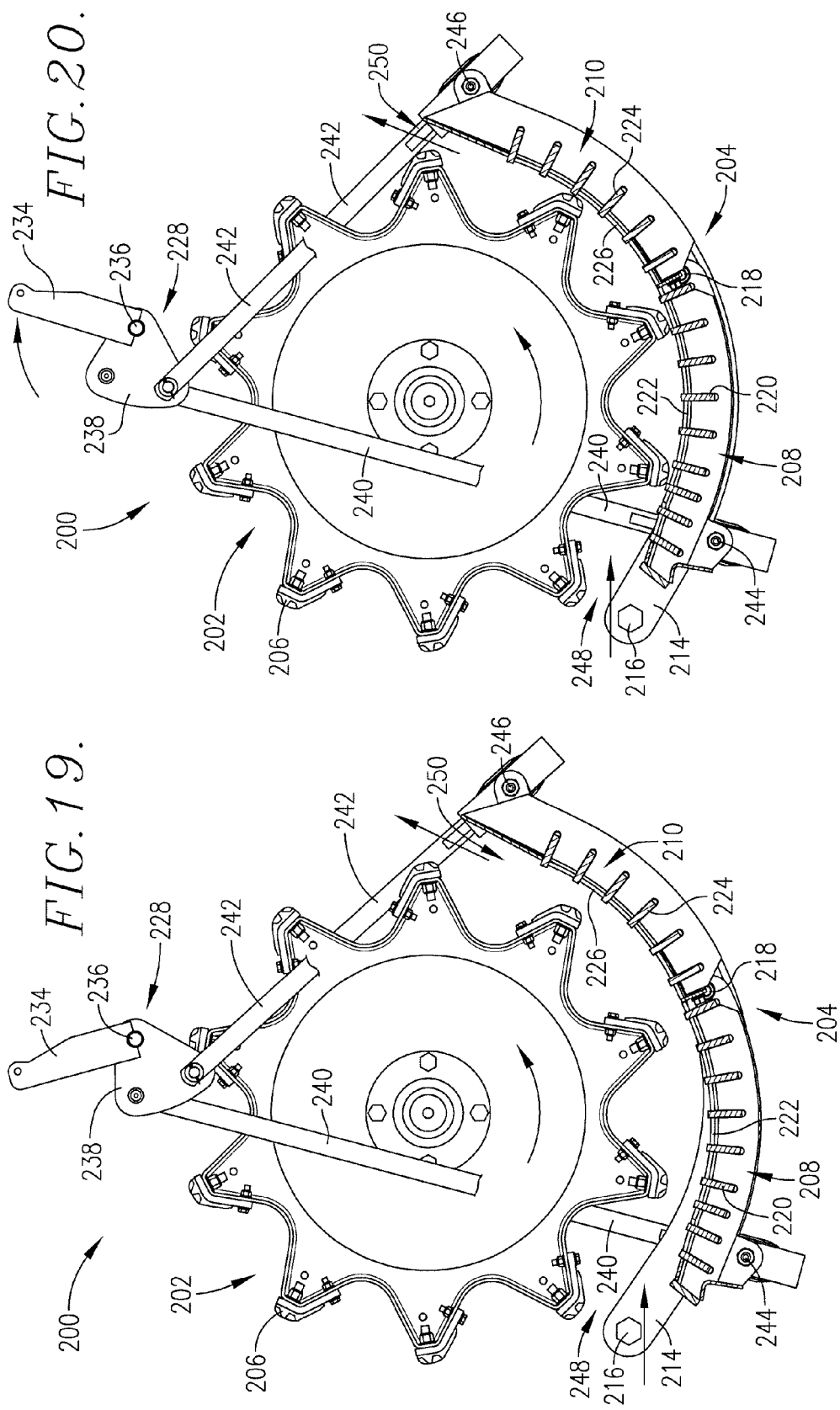

COMBINE HARVESTER PROCESSING SYSTEM HAVING ADJUSTABLE MEMBERS

TECHNICAL FIELD

This invention relates to the crop processing systems of combine harvesters.

BACKGROUND

In one type of processing system the crop travels axially parallel to and helically around the rotational axis of one or more rotary processing devices commonly referred to as rotors. In other systems, during at least a portion of its travel through the system the crop travels in a transverse or tangential direction relative to the rotational axis of a rotary processing device commonly referred to as a threshing cylinder. In each case, grain is processed between elements affixed to the periphery of the rotary device and arcuate, usually foraminous, stationary processing members in the form of threshing concaves or separating grates that partially wrap around the lower portion of the device.

Because processing systems are utilized to harvest a wide variety of different crops and must function properly in many different operating conditions, it is important to be able to conveniently and accurately adjust the running clearance in the region between the rotary processing devices and stationary processing members to best accommodate these variables. However, it is also important to provide a way of suitably changing the cross-sectional shape of such regions as the running clearance is adjusted whereby to assure that proper processing action is obtained throughout the range of adjustment. While systems using axial flow have somewhat different specific requirements from system using transverse flow due to their different principles of operation, they can both benefit from an ability to appropriately adjust the cross-sectional shape of their processing regions as the running clearance is increased or decreased.

BRIEF DESCRIPTION OF THE DRAWINGS

FIG. 9 is a left front isometric view of the processing system with the rotor removed;

FIG. 10 is a left front, exploded isometric view of the processing system with the rotor removed;

FIG. 13 is a left front isometric view of a threshing concave assembly;

FIG. 14 is a right front isometric view of a threshing concave assembly;

FIG. 15 is a right front exploded isometric view of a threshing concave assembly;

FIG. 19 is an end elevational view of the system of FIG. 18 with parts shown in cross-section for clarity and with the concave assembly illustrated in a full open position maximizing the running clearance between the threshing cylinder and the concave assembly; and FIG. 20 is an end elevational view similar to FIG. 19 of the system of FIG. 18 but showing the concave assembly in its fully closed position minimizing the running clearance between the threshing cylinder and the concave assembly.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the rear of the harvester looking forwardly.

Figure 1:
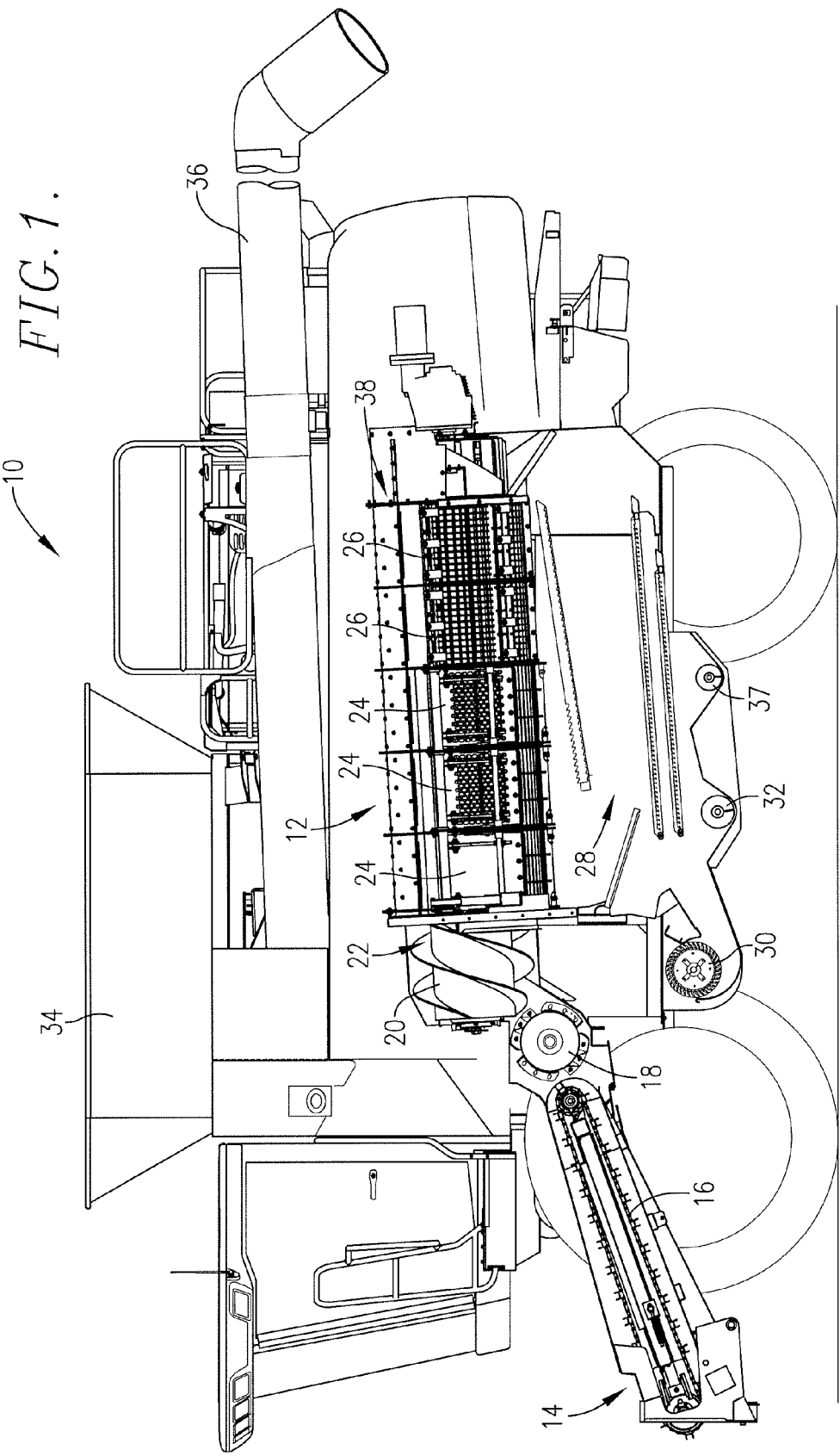
FIG. 1 is a schematic side elevational view of a combine harvester having a processing system utilizing axial flow and incorporating the principles of the present invention, portions of the harvester being broken away to reveal internal details of construction.
Figure 2:
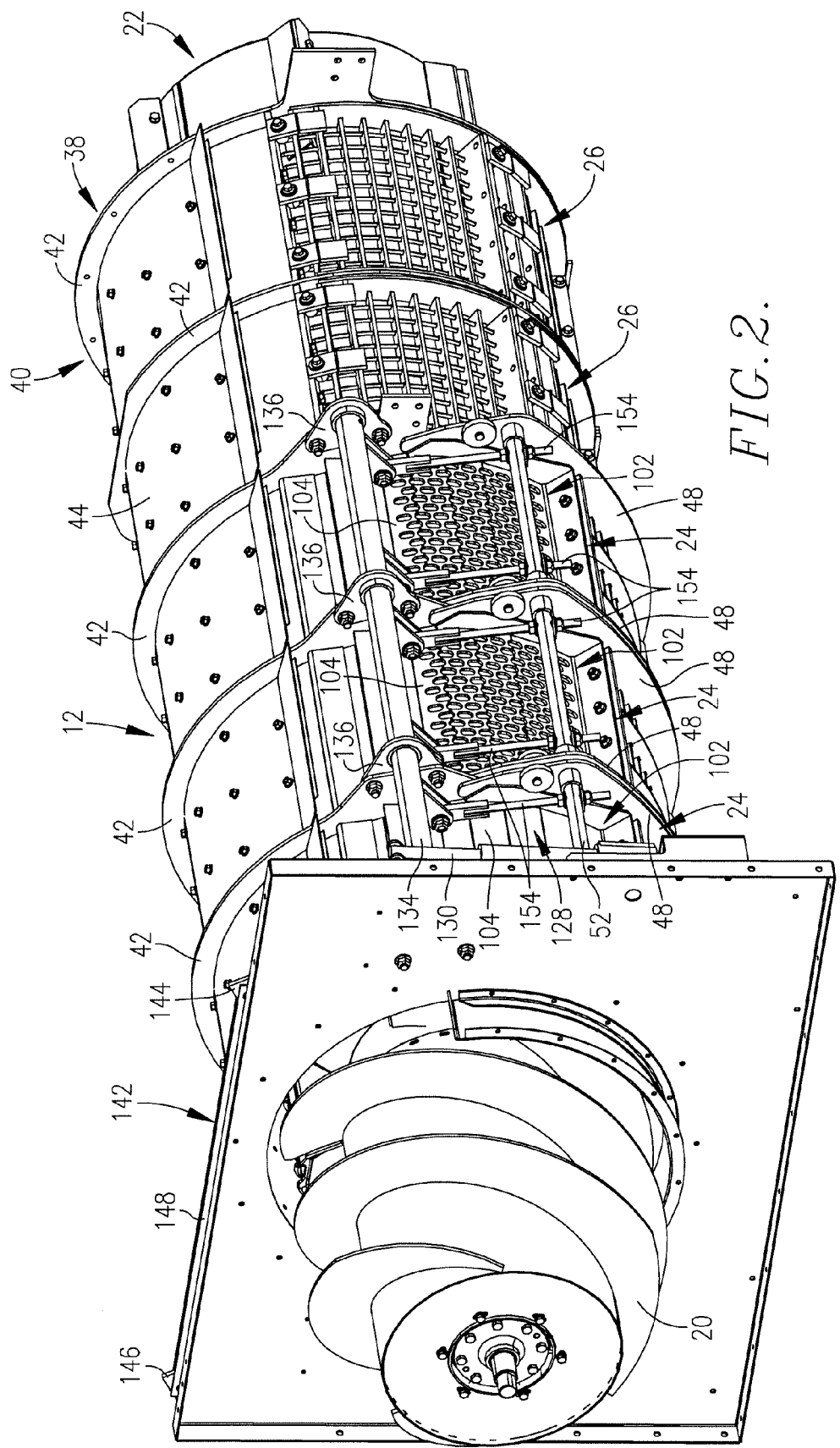
FIG. 2 is an enlarged, left front isometric view of the processing system within the harvester of FIG. 1.
Figure 3:
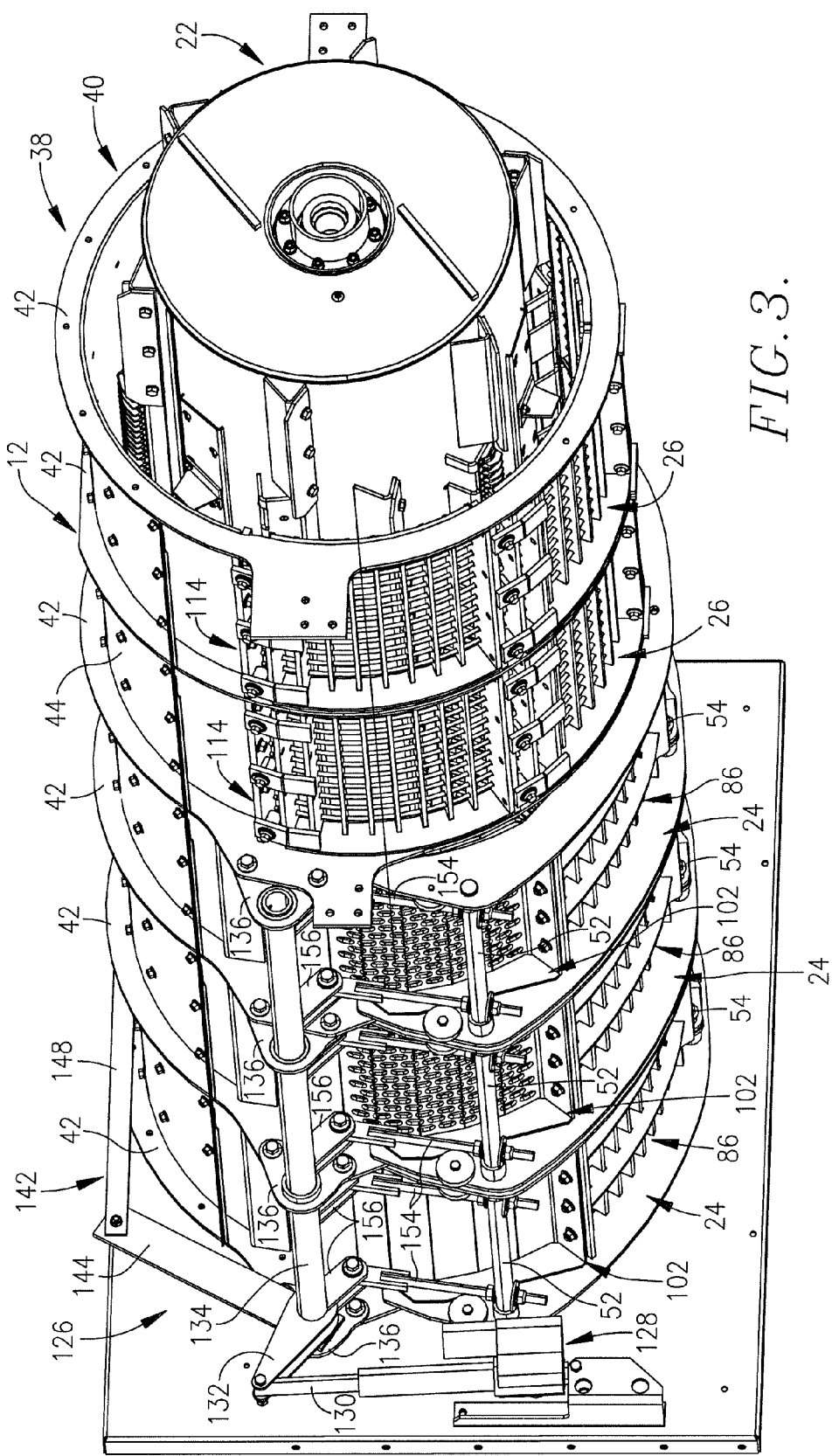
FIG. 3 is a left rear isometric view of the processing system.
Figure 4:
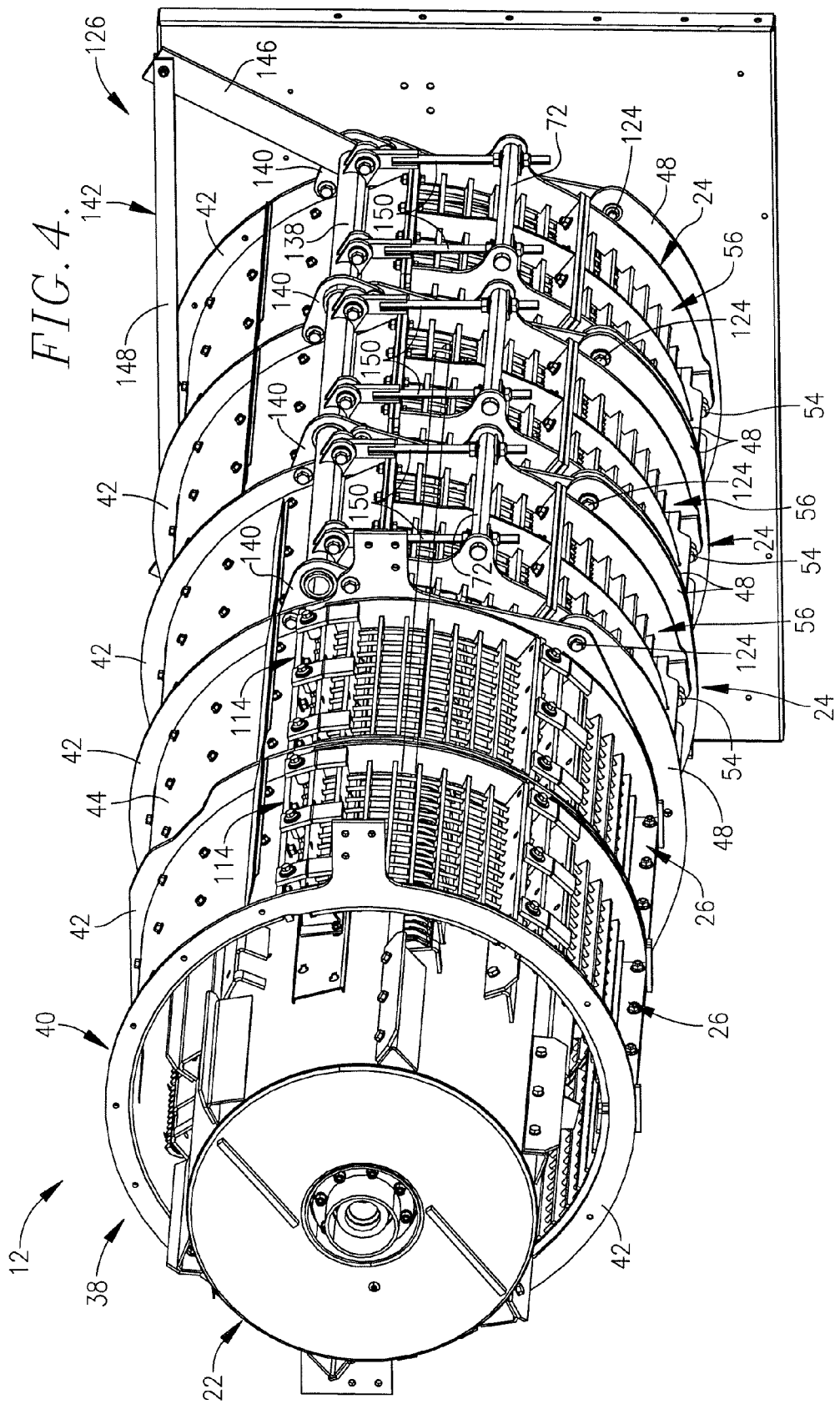
FIG. 4 is a right rear isometric view of the processing system.
Figure 5:
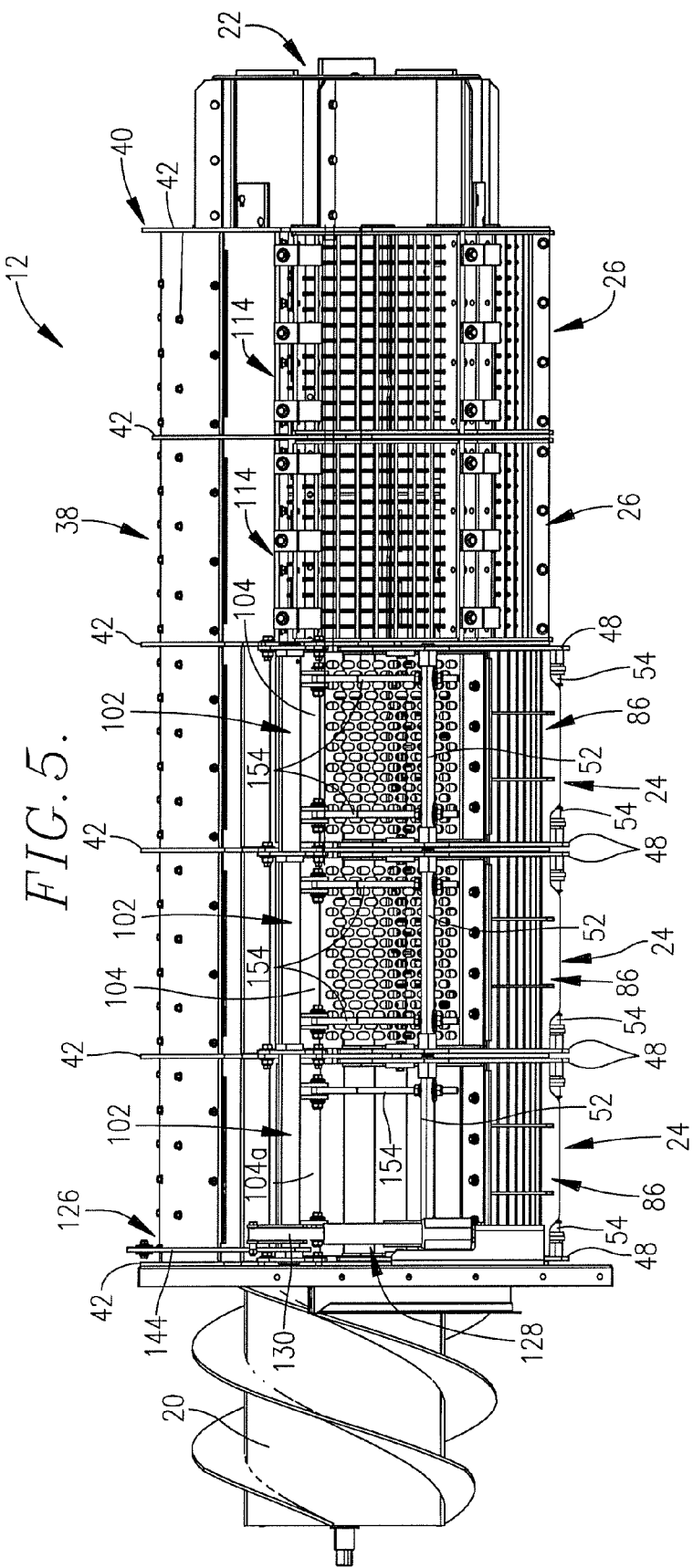
FIG. 5 is a left side elevational view of the processing system.
Figure 6:
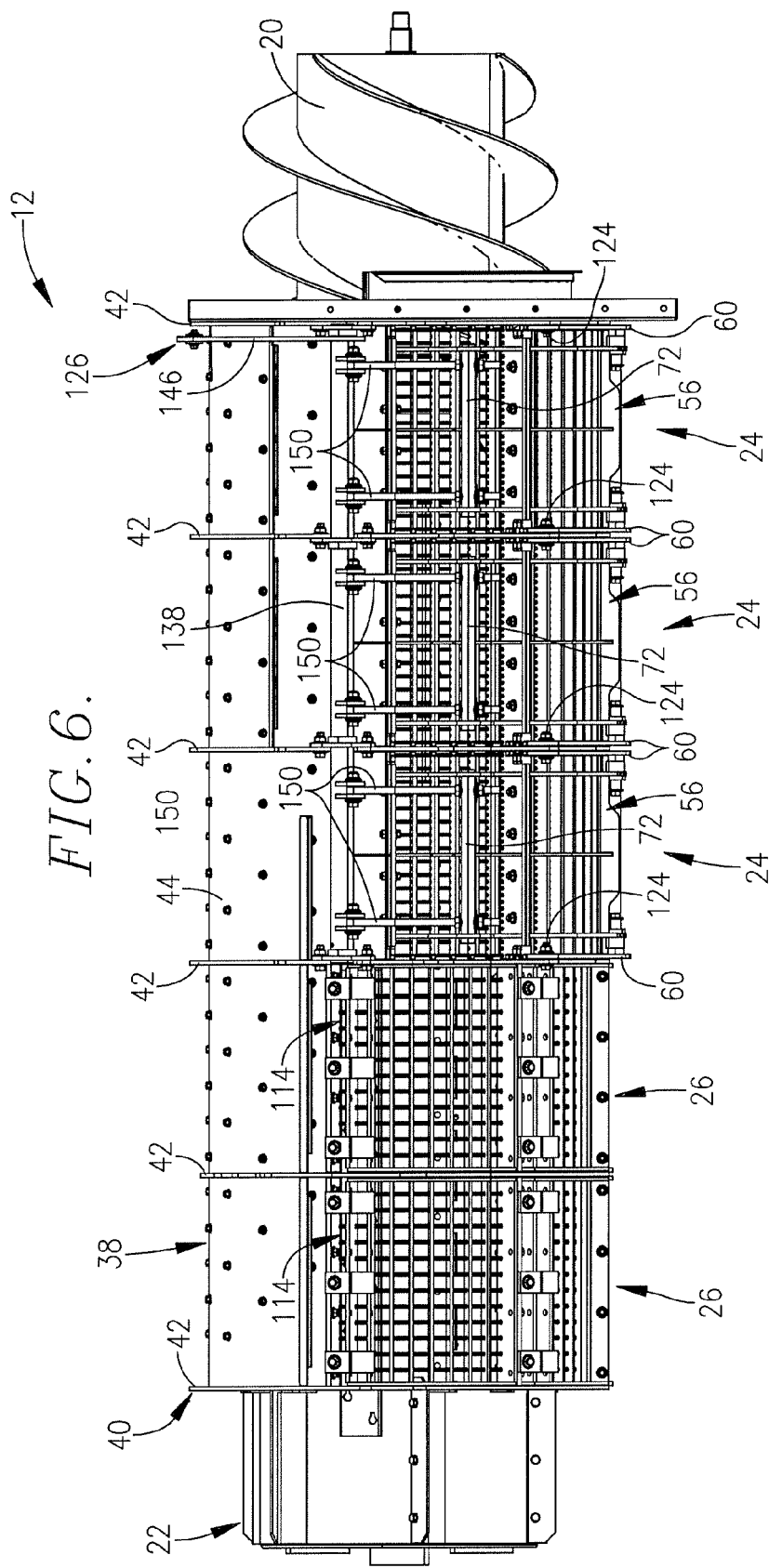
FIG. 6 is a right side elevational view of the processing system.
Figure 7:
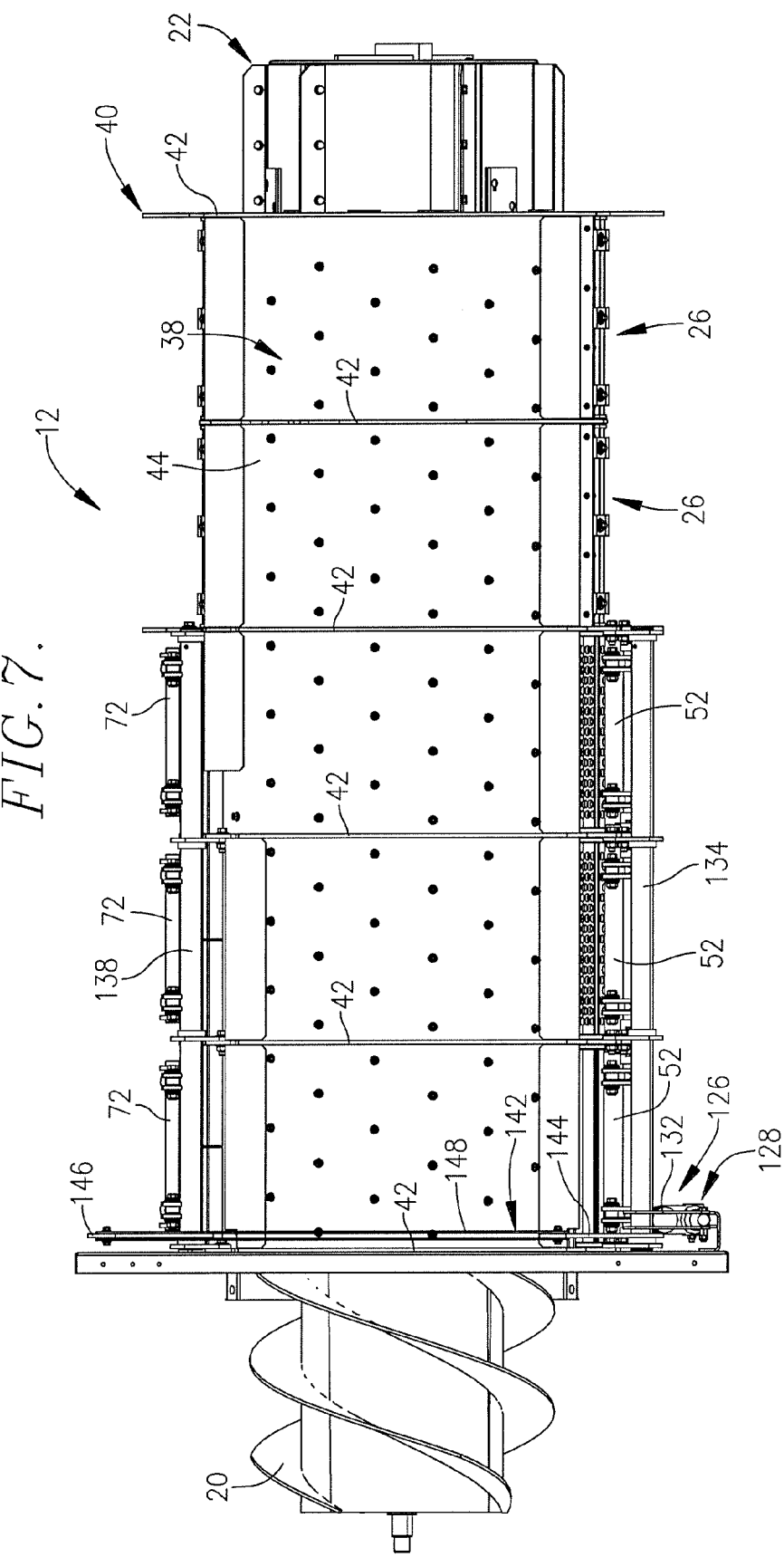
FIG. 7 is a top plan view of the processing system.
Figure 8:
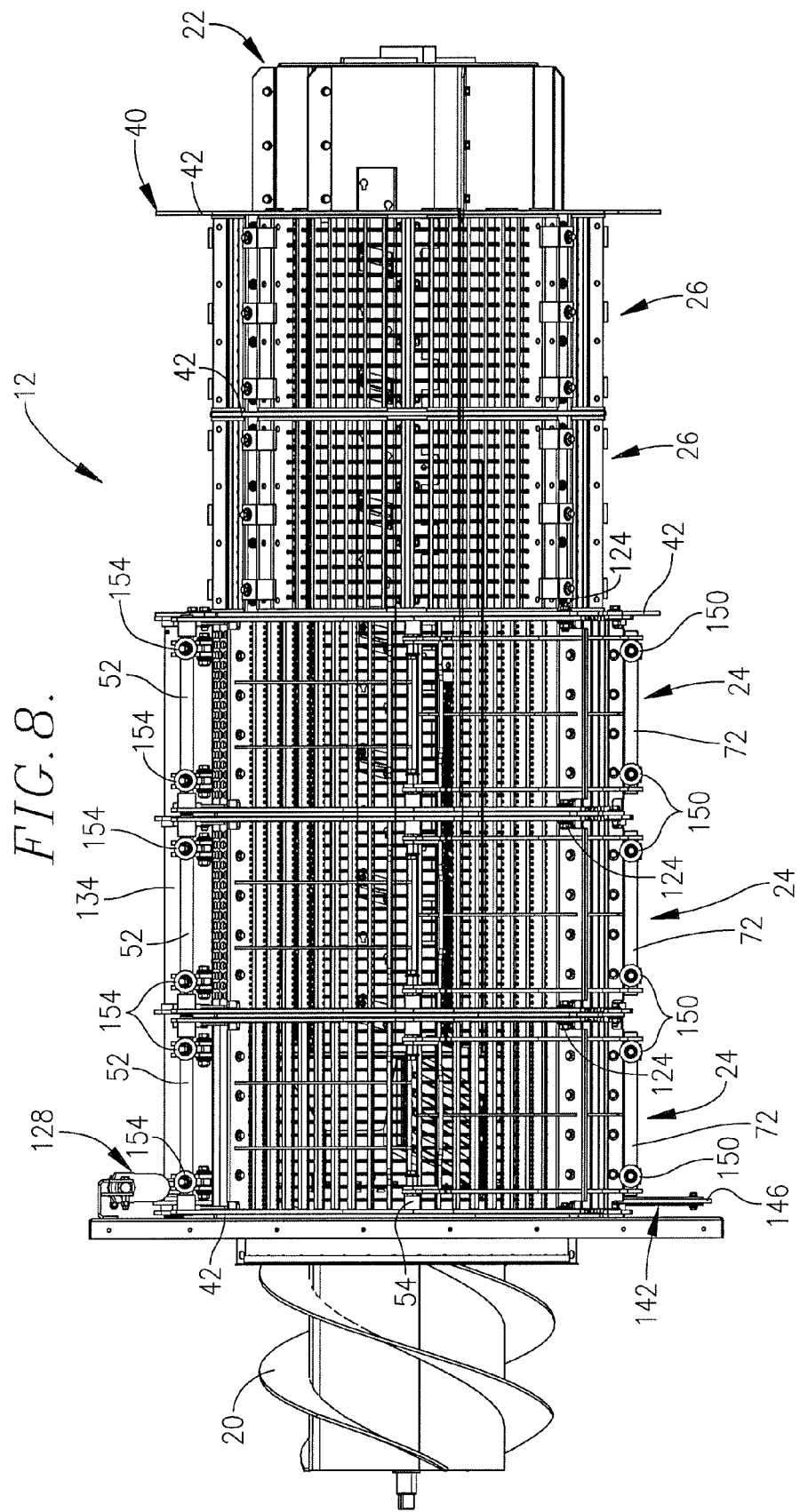
FIG. 8 is a bottom plan view of the processing system.

The exemplary combine harvester 10 selected for illustration in FIG. 1 has a single axial flow processing system 12 that extends generally parallel with the path of travel of the machine. However, as will be seen, the principles of the present invention are not limited to harvesters with processing systems designed for axial flow, nor to axial flow harvesters having only a single such processing system. However, for the sake of simplicity in explaining the principles of the present invention, this specification will proceed utilizing a single axial flow processing system as the primary example.

As well understood by those skilled in the art, in the illustrated embodiment combine harvester 10 includes a harvesting header (not shown) at the front of the machine that delivers collected crop materials to the front end of a feeder house 14. Such materials are moved upwardly and rearwardly within feeder house 14 by a conveyer 16 until reaching a beater 18 that rotates about a transverse axis. Beater 18 feeds the material upwardly and rearwardly to a rotary processing device, in this instance to a rotor 22 having an infeed auger 20 on the front end thereof. Auger 20, in turn, advances the materials axially into the processing system 12 for threshing and separating. In other types of systems, conveyor 16 may deliver the crop directly to a threshing cylinder.

Generally speaking, the crop materials entering processing system 12 move axially and helically therethrough during threshing and separating. During such travel the crop materials are threshed and separated by rotor 22 operating in cooperation with preferably foraminous processing members in the form of threshing concave assemblies 24 and separator grate assemblies 26, with the grain escaping laterally through concave assemblies 24 and grate assemblies 26 into cleaning mechanism 28. Bulkier stalk and leaf materials are retained by concave assemblies 24 and grate assemblies 26 and are impelled out the rear of processing system 12 and ultimately out of the rear of the machine. A blower 30 forms part of the cleaning mechanism 28 and provides a stream of air throughout the cleaning region below processing system 12 and directed out the rear of the machine so as to carry lighter chaff particles away from the grain as it migrates downwardly toward the bottom of the machine to a clean grain auger 32. Auger 32 delivers the clean grain to an elevator (not shown) that elevates the grain to a storage bin 34 on top of the machine, from which it is ultimately unloaded via an unloading spout 36. A returns auger 37 at the bottom of the cleaning region is operable in cooperation with other mechanism (not shown) to reintroduce partially threshed crop materials into the front of processing system 12 for an additional pass through the system.

With further reference now to FIGS. 2-17, the concave assemblies and grate assemblies 24, 26 form a part of what may be considered a tubular housing 38 that concentrically receives rotor 22 and serves as part of processing system 12. FIGS. 9 and 10, in particular, depict the housing 38. As illustrated for example in those two figures, housing 38 includes a framework 40 formed by a series of six circular ribs 42 held in mutually axially spaced apart locations. Framework 40 supports a convex top wall 44 that extends the full length of housing 38 and effectively closes off the top portion thereof from front to rear. Framework 40 also supports the threshing concave assemblies 24 and the separator grate assemblies 26, there being either a concave assembly 24 or a grate assembly 26 between each successive pair of ribs 42.

The forwardmost concave assembly 24 is illustrated in FIGS. 13-17. The other two concave assemblies 24 are similar in construction. With reference to FIGS. 13-17, it will be seen that concave assembly 24 includes a cradle-like frame 46 having a pair of arcuate, elongated and laterally spaced apart side rails 48. One end of frame 46 is provided with a pair of aligned mounting holes 50 in the two side rails 48 which provide for pivotally mounting frame 46 to framework 40 as hereinafter explained in further detail. The opposite end of frame 46 is provided with a transverse rod 52 that interconnects the two side rails 48 generally adjacent the proximal end of frame 46. A pair of aligned pintles 54 on the interior faces of side rails 48 project inwardly toward one another and are located part way between mounting holes 50 and rod 52.

Concave assembly 24 further includes a first concave 56 having an arcuate configuration similar to that of frame 46. First concave 56 is pivotally mounted on frame 46 via eyelets 58 that pivotally receive pintles 54 on frame 46. Such eyelets 58 are located at the lower ends of a pair of arcuate, laterally spaced apart members 60 that form part of a frame for a lower section 56a of concave 56. Similar laterally spaced apart members 62 form part of a frame for an upper section 56b of concave 56, the two sections 56a and 56b being bolted together by bolts 64 through adjacent transverse end plates 66 and 68 of sections 56a and 56b respectively to provide a rigid, unitary construction for the concave 56. Each concave section 56a, 56b is also provided with a longitudinally arcuate middle member that is located transversely midway between the two side members 60 or 62 and extends the full length of the section at the same radius of curvature as side members 60 and 62. A rod 72 spans the side members 62 adjacent the upper end of concave 56 similar to rod 52 of concave assembly frame 46.

Concave 56 also includes a plurality of transverse bars 74 that span the side members 60, 62 on the concave upper side thereof. Bars 74 cooperate with a series of longitudinally extending, laterally spaced apart, curved rods 76 in defining apertures for the concave 56 through which grain may pass. The upper edges of transverse bars 74 project above the longitudinally extending curved rods 76 so as to provide a stepped threshing surface that cooperates with rasp-like elements on the rotating rotor 22 for threshing and separating the grain from cobs, husks, and other crop materials. The width of concave 56 is such that it is received between side rails 48 of frame 46, with the exception that transverse bars 74 have outwardly projecting overhangs 78 at their opposite ends that overly the upper edges of frame side rails 48 and are operable to bear against the same when concave 56 is installed on frame 46. Overhangs 78 also provide a continuous surface when frames 56 are installed side-by-side in the combine.

First concave 56 is also provided at its upper end with a transverse end plate 80 that spans the side members 62 and is rigidly affixed thereto. A pair of generally reversely L-shaped overlap plates 82 are secured to end plate 80 by bolts 84 to overlap the proximal edge of top wall 44 when concave assembly 24 is installed on framework 40 as hereinafter explained.

Concave assembly 24 further includes a second concave 86 that is fixed to frame 46 and does not move relative thereto, in contrast to the pivotal concave 56. Second concave 86 commences adjacent pintles 54 and extends arcuately around frame 46 for a distance that provides concave 86 with a length dimension that is substantially the same as the length dimension of lower concave section 56a of first concave 56. Second concave 86 has a pair of transversely extending end plates 88 and 90 at its opposite ends that span the two side rails 48 and are rigidly affixed thereto. A pair of concave central members 92 and 94 are disposed between end rails 48 in laterally spaced apart relationship and are rigidly fixed at their opposite ends to end plates 88 and 90. A series of transverse bars 96 are spaced arcuately along frame 46 in parallel relationship to end plates 88 and 90 and are rigidly affixed at their opposite ends to side rails 48. Bars 96 cooperate with a plurality of longitudinally extending, concave-shaped rods 98 to define orifices within second concave 86 through which grain may pass. As with bars 74 of first concave 56, bars 96 of second concave 86 have uppermost lineal edges that project above proximal upper edges of side rails 48 so as to define stepped threshing surfaces that cooperate with rasp-like elements on rotor 22 for threshing and separating the grain from cobs, husks and other crop materials. Each transverse bar 96 has a pair of overhangs 100 at its opposite ends that overlie corresponding upper edges of side rails 48 and provide a continuous surface when frames 46 are installed side-by-side in the combine.

In lieu of an upper concave section such as upper section 56b of first concave 56, concave 86 is provided with an overlap plate 102 of generally concavo-convex configuration. Overlap plate 102 includes a panel 104 that spans the two side rails 48 of frame 46 and is provided with downturned, opposite side walls 106 that lie alongside of respective ones of the side rails 48 along the interior surfaces thereof. A similarly downturned end wall 108 (FIG. 13) adjacent concave 86 is rigidly fixed to end plate 90 thereof by bolts 110. The opposite free end 112 of overlap plate 102 extends upwardly above and beyond the proximal end of frame 46 to overlap the proximal lower edge of top wall 44 of rotor housing 38 in a manner as hereinafter explained in more detail.

Panel 104 of overlap plate 102 may be either solid or perforated as desired, and such panels are interchangeable. A solid panel retains all material for aggressive threshing, while a perforated panel allows escape of threshed grain. In the illustrated embodiment, one of the concave assemblies 24 has a solid panel 104, while the others have perforated panels 104.

The separator grate assemblies 26 each contain a plurality of end-to-end grates 114 that are each similar in construction to the lower section 56a of first concave 56. Although neither of the grate assemblies 26, nor any of the grates 114 thereof, is mounted for adjusting movement in a radial direction toward and away from rotor 22 in the particular illustrated embodiment, it is within the principles of the present invention to make grate assemblies 26 and grates 114 adjustable in the same manner as concave assemblies 24. In the illustrated embodiment, each separator grate assembly 26 is fixed to top wall 44 and to the proximal ribs 42 of framework 40. As illustrated in several of the figures, each grate 114 includes a pair of arcuate side members 116, a pair of opposite end plates 118 extending between side members 116, a plurality of transverse bars 120 spanning side members 16 and rigidly affixed thereto, and a plurality of arcuate, longitudinally extending, transversely spaced apart rods 122 passing through transverse bars 120 and opposite end plates 118. This matrix of transverse bars and longitudinally extending rods thus presents orifices through which grain may pass into the cleaning mechanism 28 so as to separate from residue within processing system 12.

Each of the concave assemblies 24 is adapted to be situated between a respective pair of ribs 42 of framework 40. The mounting holes 50 of each frame 46 of a concave assembly 24 receives a pivot bolt 124 on the right side of the axis of rotation of rotor 22 within the lower right quadrant of the framework 40. Thus, each concave assembly 24 wraps around the bottom of rotor 22 in a circumferential direction and is adapted to pivot generally radially toward and away from rotor 22 about a common longitudinally extending axis defined by bolts 124. The overlap plates 82 associated with the upper ends of the first concave 56 are disposed radially inside the proximal extremity of top wall 44 in overlapping relationship therewith. On the other hand, the overlap plate 102 associated with the upper end of second concave 86 is disposed radially outside of the proximal edge extremity of top wall 44 in overlapping relationship therewith.

The concave assemblies 24 are moved adjustably toward and away from rotor 22 about pivot bolts 124 by operating mechanism broadly denoted by numeral 126. Such operating mechanism 126 also functions to move the first concaves 56 relative to frames 46 and second concaves 86 while assembly 24 as a whole is being adjusted. Thus, operating mechanism 126 functions to simultaneously adjust the entirety of each concave assembly 24 relative to rotor 22 while also adjusting first concave 56 thereof about pivot bolts 54 so as to adjust the running clearance between rotor 22 and concave assemblies 24 and to change the shape of the threshing region.

The primary component of operating mechanism 126 is an actuator 128 located near the left front of processing system 12 and mounted on portions of the combine harvester frame structure. Preferably, actuator 128 is remotely operable, such as from the cab of harvester 10. In one preferred embodiment, actuator 128 comprises an electrically powered linear actuator. It will appreciated, however, that actuator 128 could comprise a number of different devices, such as a hydraulic cylinder or a turnbuckle, for example.

The control rod 130 of actuator 128 is connected pivotally at its upper end to a bell crank 132 that also forms a part of operating mechanism 126. Bell crank 132 is, in turn, fixed to other components of operating mechanism 126, including a fore-and-aft extending rockshaft 134 located in the upper left quadrant of processing system 12 and extending parallel to the axis of rotation of rotor 22. Rockshaft 134 is journaled for rotation within four ears 136 projecting generally radially outwardly from respective ones of the first four ribs 42 of framework 40. Mechanism 126 further includes a similar second rockshaft 138 on the opposite side of processing system 12 and journaled for rotation about an axis extending parallel to the axis of rotation of rotor 22 by ears 140 on the first four ribs 42.

Operating mechanism 126 further includes linkage 142 operably interconnecting rockshafts 134 and 138 for constraining the rockshafts to rotational movement in unison. In a preferred form, such linkage 142 includes a generally upright arm 144 fixed at its lower end to rockshaft 134, a second generally upright arm 146 fixed at its lower end to rockshaft 138, and an elongated, transversely extending strap 148 pivotally connected at its opposite ends to the upper ends of arms 144, 146. Strap 148 passes over and above rotor housing 38 adjacent the front end thereof and remains in a horizontal attitude throughout its various operating positions inasmuch as arms 144 and 146 are of equal lengths and are disposed in mutually parallel relationship.

Operating mechanism 126 further includes, for each concave assembly 24, a pair of generally upright links 150 on the right side of processing system 12 pivotally connected between rotary rod 72 of the first concave 56 and a corresponding pair of short cranks 152 fixed to rod shaft 138 at axially spaced locations along the length thereof. Similarly, on the opposite side of processing system 12, each concave assembly 24 has a pair of generally upright links 154 that are connected between pivot rod 52 and a corresponding pair of short cranks 156 fixed to rockshaft 134 at axially spaced locations along the length of the latter.

OPERATION

Figure 11:
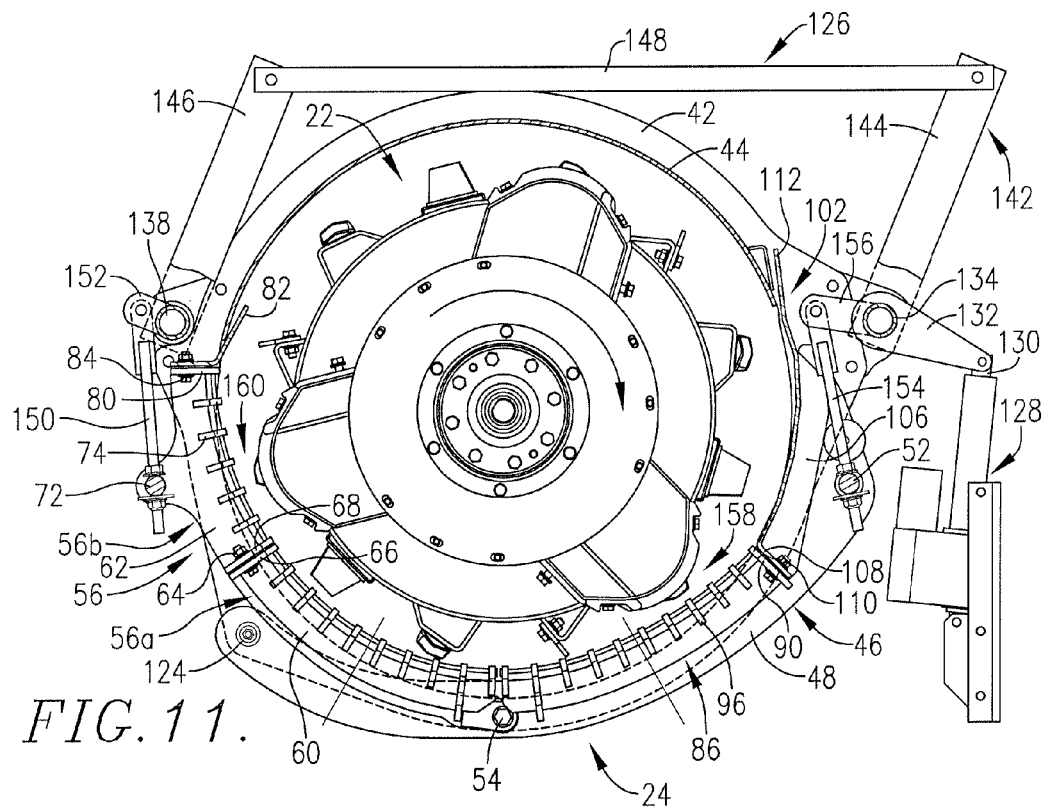
FIG. 11 is a front elevational view of the processing system with the infeed auger removed and illustrating the threshing concave assemblies in their fully closed position to minimize the running clearance between the rotor and the concave assemblies.
Figure 12:
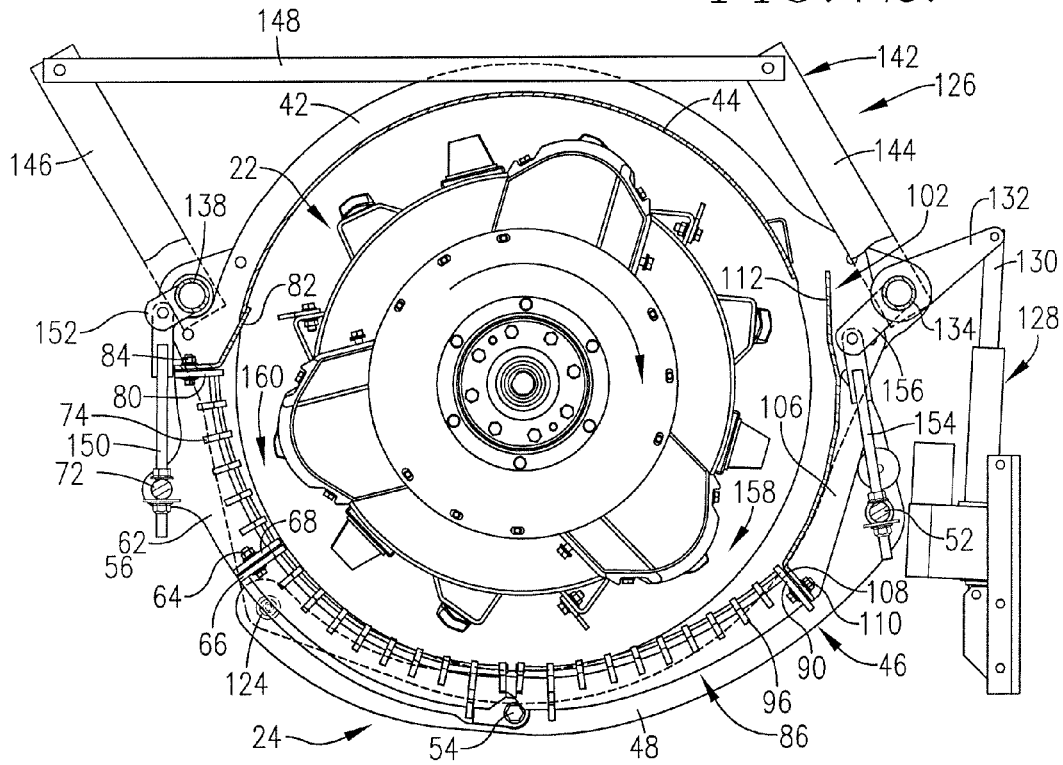
FIG. 12 is an end elevational view of the processing system similar to FIG. 11 but illustrating the concave assemblies in their fully open position maximizing the running clearance between the rotor and the concave assemblies.
Figure 16:
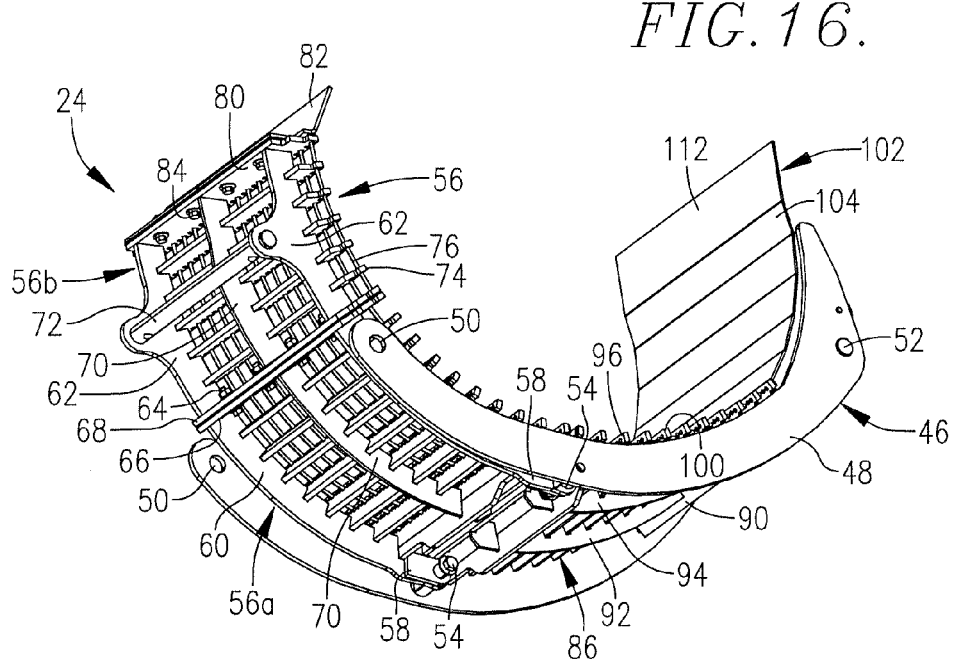
FIG. 16 is a lower right front isometric view of a threshing concave assembly.
Figure 17:
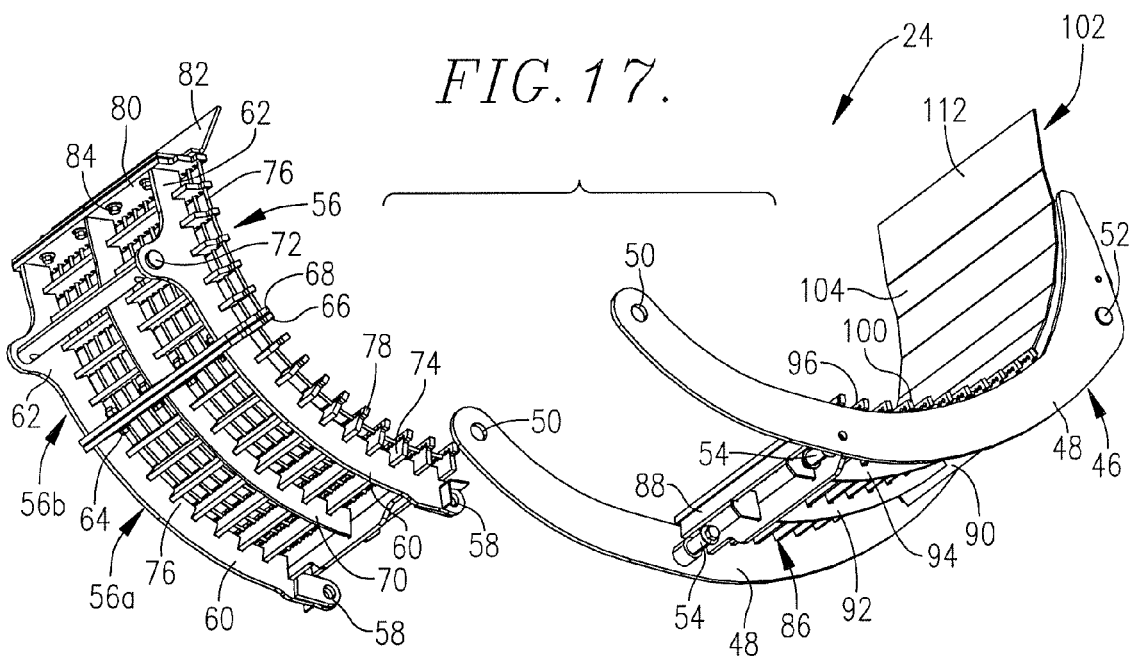
FIG. 17 is a lower, right front exploded isometric view of a threshing concave assembly.

As illustrated in FIGS. 11 and 12, rotor 22 rotates in a clockwise direction as viewed from the front of the machine. Thus, as crop materials are introduced into the front end of processing system 12, they move helically within and about rotor housing 38 in a clockwise direction as FIGS. 11 and 12 are viewed. The threshing action occurs in a threshing region located generally in the bottom half of the processing system 12, between the periphery of rotor 22 and concave assemblies 24. A converging, generally wedge-shaped inlet to the threshing region for crop materials coming around rotor 22 is denoted broadly by the numeral 158 in FIGS. 11 and 12, while an opposite, diverging, generally wedge-shaped outlet from the threshing region is denoted by the numeral 160 in those figures.

In the illustrated embodiment, in the minimum clearance position of FIG. 11 the concave assembly 24 is concentric with rotor 22 over an arc of approximately sixty degrees on opposite sides of and symmetrical with pintles 54 of concave assembly frame 46. To increase threshing and separating aggressiveness, the area of concentricity could be extended significantly beyond sixty degrees such as, for example, to one hundred twenty degrees.

As concave assembly 24 is adjusted toward the fully open position of FIG. 12 to increase the running clearance between rotor 22 and concave assembly 24, the compound pivoting action of concave assembly 24 causes the threshing region to change shape to converge essentially smoothly in the direction of rotor rotation, with inlet 158 becoming significantly wider than outlet 160. Despite full open adjustment, an undesirable central area of large clearance does not develop in the threshing region due to the compound pivoting action of concave assembly 24 during such adjustment. In this regard, although the entire concave assembly 24 is moved toward or away from rotor 22 about pivot 124 when actuator 128 is operated, first concave 56 is also simultaneously pivoted an extra compensating amount about pintles 54 relative to the rest of the concave assembly to achieve the desired shape. In some prior art arrangements having fixed profile concave assemblies, the concave assemblies are merely shifted transversely toward or away from the rotor. This has the disadvantage of creating a large clearance area in the central region of the concave assembly when the assembly is shifted away from the rotor, thereby decreasing the aggressiveness of the threshing action in that area.

When actuator 128 is retracted from its full open position in FIG. 12, both concaves 56 and 86 are simultaneously moved inwardly toward rotor 22. In addition, however, due to the presence of operating linkage 126, first concave 56 is moved an additional amount relative to frame 46 and second concave 86 to appropriately reshape the threshing region.

ALTERNATIVE EMBODIMENT

Figure 18:
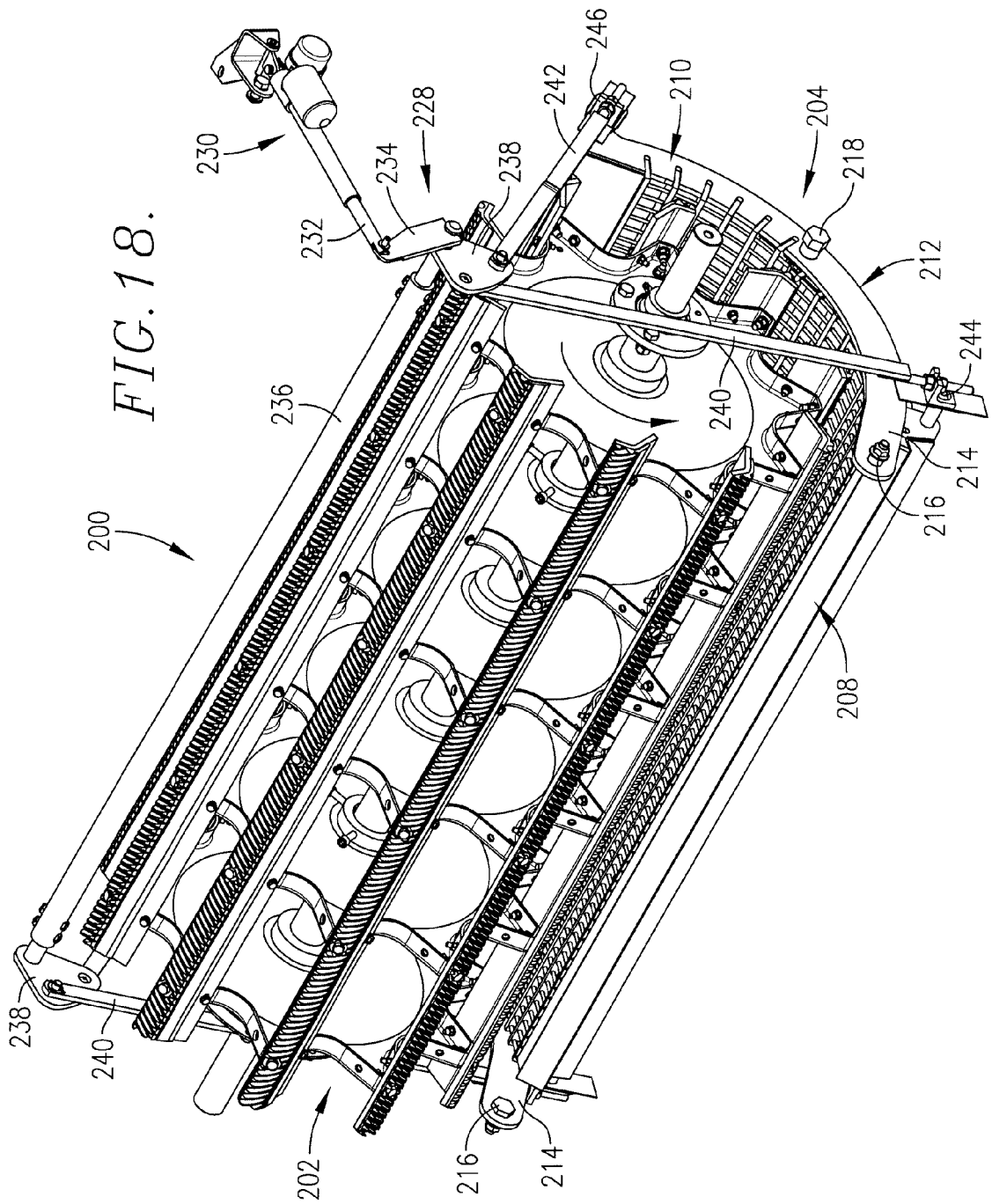
FIG. 18 is an isometric view of a processing system utilizing transverse flow and incorporating the principles of the present invention.

FIGS. 18-20 illustrate an alternative processing system utilizing the principle of transverse flow. In this embodiment, processing system 200 has a rotary processing device commonly known as a threshing cylinder 202 that cooperates with a preferably foraminous concave assembly 204 for threshing crop materials. Concave assembly 204 wraps partially circumferentially beneath cylinder 202 and is radially movable toward and away therefrom to increase or decrease the running clearance between rasp bars 206 of cylinder 202 and a pair of concaves 208 and 210 of concave assembly 204.

Concave assembly 204 comprises an arcuate frame 212 having a pair of axially spaced apart side rails 214 that are pivoted to stationary portions of the harvester frame (not shown) by pivot bolts 216. Thus, frame 212 and concave assembly 204 can be adjustably pivoted toward and away from cylinder 202 about pivot bolts 216.

The first concave 208 is pivotally mounted between side rails 214 for pivoting movement relative thereto by a pair of axially extending, aligned pintles 218 (only one being shown) at the approximate mid-length point of frame 212. Thus, first concave 208 is pivotal relative to frame 212 between a closed position of FIG. 20 and an open position of FIG. 19.

First concave 208 is generally similar in construction to the lower and upper concave sections 56a and 56b associated with concave 56 of the first embodiment. Thus, first concave 208 has a plurality of transverse bars 220 and a plurality of longitudinally extending rods 222, the bars 220 being of such length that they do not overlap the top edges of side rails 214 of frame 212. Second concave 210, on the other hand, is more like second concave 86 of the first embodiment, having transversely extending bars 224 that overlap and are fixed to the upper arcuate edges of side rails 214 of frame 212. The second concave 210 also has a plurality of curved, longitudinally extending and laterally spaced apart rods 226. As a result of this construction of second concave 210, it is fixed to frame 212 and does not move relative thereto as frame 212 is pivoted toward and away from cylinder 202 about pivot bolts 216.

Operating mechanism 228 is provided for simultaneously adjusting concave assembly 204 toward and away from cylinder 202 and first concave 208 relative to second concave 210 in a compound pivoting action. To this end, operating mechanism 228 includes an actuator 230 that is preferably remotely actuatable from the cab of the harvester. The rod 232 of actuator 230 is operably coupled with a crank 234 that is fixed to one end of a rockshaft 236 disposed above cylinder 202 and extending the full length thereof. Rockshaft 236 is supported by means not illustrated to remain in a fixed vertical and horizontal position as it is rocked about its longitudinal axis.

Operating mechanism 228 further includes a pair of generally triangular bell cranks 238 fixed to opposite ends of rockshaft 236. Each crank 238, in turn, is pivotally connected to a pair of operating links 240 and 242 that are connected to crank 238 at its respective corners opposite rockshaft 236.

The lower ends of links 240 have pivotal couplings 244 with the free end of first concave 208, while the lower ends of links 242 have pivotal couplings 246 with the free end of second concave 210.

Consequently, when actuator 230 extends and retracts, such motion is imparted to rockshaft 236 which in turn simultaneously pivots concave assembly 204 relative to cylinder 202 and first concave 208 relative to second concave 210. Such compound pivoting action causes the threshing region between cylinder 202 and concave assembly 204 to be reshaped appropriately as the running clearance is adjusted.

In this regard, it is to be noted that when concave assembly 204 is in its fully closed, minimum clearance position of FIG. 20, concave assembly 204 is concentric with cylinder 202 over approximately ninety-five degrees of wrap. A converging inlet 248 that tapers in the direction of rotation is defined at one end of the threshing region, while a diverging outlet 250 is defined at the opposite end of the threshing region.

As concave assembly 204 is pivoted away from cylinder 202 toward its fully open position of FIG. 19 to increase the running clearance, the threshing region is simultaneously reshaped to produce a highly desirable, gradual and smoothly tapering wedge in the direction of cylinder rotation from the inlet to the outlet. From the fourth bar 220 inwardly from inlet 248 to the last bar 220 adjacent outlet 250 there is a relatively linear decrease in clearance, creating the special wedge shape for the threshing region. Such reshaping during increase in running clearance is obtained as a result of the compound pivoting action that occurs when first concave 208 pivots away from second concave 210 about pintles 218 as assembly 204 as a whole pivots away from cylinder 202 about pivots 216.

It is to be noted that in both of the foregoing embodiments, all links of the operating mechanisms 126, 228 are designed to be in tension. Since members in tension are not subject to buckling, they can be designed lighter and simpler while retaining reliability.

It will also be noted that the adjusting mechanism 126 of the first embodiment could be used satisfactorily with both axial flow and transverse flow, although it is less necessary with transverse flow. By using overhead linkage rather than linkage that traverses the circle defined by the rotating threshing device, the mechanism 126 avoids obstructing the inflow of crop materials or interfering with other intake structure in axial flow. While this same approach could be used in conjunction with transverse flow, it is not necessary since having linkage that crosses the circle defined by the threshing cylinder is not a problem. On the other hand, the adjusting mechanism 228 of the second embodiment is simpler and is thus preferred where possible, such as where transverse flow occurs.

What is claimed is:

1. In a combine harvester having a rotary crop processing device, the improvement comprising:

an arcuate processing assembly extending generally in a circumferential direction beneath the rotary device and movable generally radially toward and away therefrom for adjusting the operating clearance between the rotary device and the assembly, said assembly including a pair of arcuate members extending successively in a circumferential direction, one of said members being adjustably movable toward and away from the rotary device relative to the other member; and operating mechanism operably coupled with said assembly in a manner to effect said adjustable movement of said one member relative to said other member simultaneously with adjustment of the assembly toward and away from the rotary device.

2. In a combine harvester as claimed in claim 1,
said adjusting movement of said assembly being pivotal movement.

3. In a combine harvester as claimed in claim 2,
said adjusting movement of said one member relative to the other member being pivotal movement.

4. In a combine harvester as claimed in claim 1,
said adjusting movement of said one member relative to the other member being pivotal movement.

5. In a combine harvester as claimed in claim 1,
said assembly including a frame that is pivotal toward and away from the rotary device,
said assembly being mounted on the frame,
said one member having a pivotal connection with said frame for carrying out said adjusting movement relative to the frame and said other member.

6. In a combine harvester as claimed in claim 5,
said other member being spaced circumferentially from said axis of pivoting movement of the frame.

7. In a combine harvester as claimed in claim 6,
said one member extending generally circumferentially away from its pivotal connection with said frame and away from said other member.

8. In a combine harvester as claimed in claim 7,
said pivotal connection of said one member to said frame being disposed generally adjacent said other member and spaced in a circumferential direction from said axis of pivoting movement of said frame.

9. In a combine harvester as claimed in claim 8,
said mechanism including a first link connected with said one member and a second link connected with said other member.

10. In a combine harvester as claimed in claim 9,
said first and second links being operably coupled with a common actuator.

11. In a combine harvester as claimed in claim 10,
said mechanism further including a pair of axially extending rockshafts on opposite sides of the rotary device and a linkage operably interconnecting said rockshafts for constraining the rockshafts to rotational movement in unison,
said first link being operably connected with one of said rockshafts and said second link being operably connected with the other of said rockshafts,
said actuator being operably connected with one of said rockshafts.

12. In a combine harvester as claimed in claim 10,
said mechanism including a single rockshaft extending axially of the rotary device,
said first and second links and said actuator being operably connected to said rockshaft.

13. In a combine harvester as claimed in claim 1,
said mechanism including a first link connected with said one member and a second link connected with said other member.

14. In a combine harvester as claimed in claim 13,
said first and second links being operably coupled with a common actuator.

15. In a combine harvester as claimed in claim 14,
said mechanism further including a pair of axially extending rockshafts on opposite sides of the rotary device and a linkage operably interconnecting said rockshafts for constraining the rockshafts to rotational movement in unison,
said first link being operably connected with one of said rockshafts and said second link being operably connected with the other of said rockshafts,
said actuator being operably connected with one of said rockshafts.

16. In a combine harvester as claimed in claim 14,
said mechanism including a single rockshaft extending axially of the rotary device,
said first and second links and said actuator being operably connected to said rockshaft.

17. In a combine harvester as claimed in claim 1,
said rotary device comprising a rotor disposed for axial entry of crop materials into the space between the rotor and the assembly.

18. In a combine harvester as claimed in claim 17,
said mechanism including a pair of axially extending rockshafts on opposite sides of the rotor and operably connected with respective ones of said assembly,
said mechanism further including an actuator operably coupled with one of said rockshafts and a linkage constraining said rockshafts to rotational movement in unison.

19. In a combine harvester as claimed in claim 1,
said rotary device comprising a cylinder disposed for transverse entry of crop materials into the space between the cylinder and the assembly.

20. In a combine harvester as claimed in claim 19,
said mechanism including a single axially extending rockshaft operably coupled with said assembly and an actuator operably coupled with said rockshaft.

21. In a combine harvester as claimed in claim 1,
further comprising an elongated, generally cylindrical framework surrounding said rotary device in radially spaced relation thereto,
said framework including a plurality of axially spaced, arcuate ribs,
said assembly being swingably mounted on and between a pair of said ribs.

22. In a combine harvester as claimed in claim 21,
said assembly including a frame that is pivotal toward and away from the rotary device,
said assembly being mounted on the frame,
said one member having a pivotal connection with said frame for carrying out said adjusting movement relative to the frame and said other member.

23. In a combine harvester as claimed in claim 22,
said other member being spaced from said axis of pivoting movement of the frame.

24. In a combine harvester as claimed in claim 23,
said one member extending circumferentially away from said pivotal connection with said frame and from said other member.

25. In a combine harvester as claimed in claim 24,
said pivotal connection of said one member to said frame being disposed generally adjacent said other member and spaced in a circumferential direction from said axis of pivoting movement of said frame.

26. In a combine harvester as claimed in claim 1,
said members having openings therethrough.

27. In a combine harvester as claimed in claim 26,
said members comprising threshing concaves.

28. In a combine harvester as claimed in claim 26,
said members comprising separating grates.

* * * * *